United States Patent
Gamble, II et al.

(10) Patent No.: US 7,766,257 B2
(45) Date of Patent: Aug. 3, 2010

(54) VARIABLE DISCHARGE MECHANISM FOR HOPPER SPREADER APPARATUS

(75) Inventors: Robert N. Gamble, II, Watertown, WI (US); Lynn W. Schultz, Campbellsport, WI (US); Terry C. Wendorff, Slinger, WI (US)

(73) Assignee: Sno-Way International, Inc., Hartford, WI (US)

( * ) Notice: Subject to any disclaimer, the term of this patent is extended or adjusted under 35 U.S.C. 154(b) by 246 days.

(21) Appl. No.: 11/060,292

(22) Filed: Feb. 17, 2005

(65) Prior Publication Data

US 2006/0180680 A1   Aug. 17, 2006

(51) Int. Cl.
*A01G 25/09* (2006.01)
*A01C 19/00* (2006.01)

(52) U.S. Cl. .................. 239/172; 239/379; 239/676
(58) Field of Classification Search ................ 239/172, 239/146, 164, 170, 379, 390, 570, 581.1, 239/581.2, 451, 455–457, 650, 661, 676, 239/678, 681, 687
See application file for complete search history.

(56) References Cited

U.S. PATENT DOCUMENTS

| | | | |
|---|---|---|---|
| 2,537,913 A * | 1/1951 | Rimple ...................... 239/682 |
| 2,773,626 A * | 12/1956 | Gandrud ...................... 222/43 |
| 3,703,260 A | 11/1972 | Grabske |
| 3,760,933 A | 9/1973 | Maldels |
| 4,681,265 A * | 7/1987 | Brabb et al. ................ 239/665 |
| 4,712,717 A | 12/1987 | Egerdahl |
| 4,785,976 A * | 11/1988 | Bennie et al. ............... 222/370 |
| 4,867,381 A * | 9/1989 | Speicher .................... 239/665 |
| 4,991,781 A * | 2/1991 | Barbieri ..................... 239/661 |
| 5,755,387 A | 5/1998 | Hedrick |
| 5,947,391 A | 9/1999 | Beck |
| 6,089,478 A | 7/2000 | Truan |
| 8,173,904 | 1/2001 | Doherty |
| 6,193,175 B1 * | 2/2001 | Andersson et al. .......... 239/656 |
| 6,220,532 B1 | 4/2001 | Manon |
| 6,702,208 B1 | 3/2004 | Hadler |

* cited by examiner

*Primary Examiner*—Davis Hwu
(74) *Attorney, Agent, or Firm*—Reinhart Boerner Van Deuren s.c.

(57) ABSTRACT

A variable discharge mechanism for a hopper spreader apparatus includes first and second flow control members that allow varying the discharge rate by providing relative rotation between flow gate members to adjust the size of a delivery opening and thus the discharge volume flow rate. The distribution pattern can be changed by changing the location of the delivery opening with respect to an axis extending in the direction of travel of the vehicle.

16 Claims, 9 Drawing Sheets

VARIABLE DISCHARGE MECHANISM FOR HOPPER SPREADER APPARATUS

BACKGROUND OF THE INVENTION

Field of the Invention

This invention relates to hopper spreader apparatus for spreading dry, free flow materials, and more particularly, to a hopper spreader apparatus including a variable discharge mechanism.

The spreading of salt and/or sand is a requirement in many areas for maintaining roads and driveways during the winter months. Various types of spreader units have been developed for spreading dry, free flow materials, such as salt and sand, for example. Many of these spreader units have been designed for mounting on vehicles, such as pick-up trucks, because of the availability of pick-up trucks to those who are involved in road and driveway maintenance.

One known type of spreader unit includes a hopper having a discharge outlet near the bottom of the hopper through which the particulate material, such as salt, falls onto a spinner. The spinner that is spun by a drive assembly for spreading the particulate material discharged from the hopper over a wide distribution area.

By rotating the spinner as the particulate material is being delivered to the spinner, the particulate material is centrifugally propelled by the spinner in a wide pattern onto the ground surface on which the vehicle is moving. Typically, the spinner is mounted on a drive shaft that is rotated by a motor, the speed of which is controllable by the driver of the vehicle to change the area over which the particulate material is distributed.

Generally, it is desirable to adjust the volume and/or the distribution pattern for the material being discharged out of the hopper. Accordingly, some spreader units include a flow rate adjustment mechanism provided by controlling an outlet orifice located in the discharge outlet of the hopper, as is known. In addition, flow path adjustment plates can be mounted adjacent to the spinner to provide width and/or range adjustment. Typically, the flow rate adjustment mechanism is a one-piece unit having a handle or lever that has a knife edge that is positionable to adjust the flow rate of particulate matter to the spinner. In known flow control gating arrangements, the outlet of the flow control gating is located at the periphery of the spinner at the back of the hopper. While known flow control gating arrangements allow adjustment in the flow rate, they do not permit changing the direction of flow because the location of the outlet of the flow control gating, i.e., the point at which the material is delivered to the spinner, is fixed. Moreover, it is difficult for an operator to know the setting of the flow gate (i.e., the size of the outlet orifice) and thus how much material will be discharged out of the hopper.

It is accordingly the primary objective of the present invention that it provide an improved hopper spreader apparatus for dispensing dry, free flow material.

It is another objective of the present invention that it provide a variable discharge mechanism for hopper spreader apparatus that allows adjustment of both the flow rate and the distribution pattern of free flow material particulate material being discharged from the hopper spreader apparatus.

Another objective of the present invention is that it provide a variable discharge mechanism for hopper spreader apparatus that is simple in construction and use.

The hopper spreader apparatus including a variable discharge mechanism of the present invention must also be of construction which is both durable and long lasting, and it should also require little or no maintenance to be provided by the user throughout its operating lifetime. In order to enhance the market appeal of the hopper spreader apparatus including a variable discharge mechanism of the present invention, it should also be of inexpensive construction to thereby afford it the broadest possible market. Finally, it is also an objective that all of the aforesaid advantages and objectives be achieved without incurring any substantial relative disadvantage.

SUMMARY OF THE INVENTION

The disadvantages and limitations of the background art discussed above are overcome by the present invention which provides a hopper spreader apparatus including a variable discharge mechanism for dispensing dry, free flow material. The variable discharge mechanism allows varying the discharge rate by providing relative rotation between flow gate members of the mechanism for adjusting the size of a delivery opening, and thus, the discharge volume flow rate for the hopper spreader apparatus. In addition, the distribution pattern for the material being spread can be changed by changing the location of the delivery opening with respect to a spinner of the hopper spreader apparatus.

In accordance with the invention, the hopper spreader apparatus includes a hopper for containing dry, free flow material to be spread. The hopper has a discharge outlet for dispensing the free flow material and a spinner, located adjacent to the discharge outlet, receives free flow material discharged from the hopper and spreads the material over a large distribution area. The variable discharge mechanism is interposed between the discharge outlet and the spinner for controlling the volume flow rate and the distribution pattern of the material being dispensed.

The variable discharge mechanism includes first and second flow gate members each having a discharge aperture therethrough. The first flow gate member overlies the second flow gate member and the flow gate members are aligned so that the discharge aperture in the first flow gate member at least partially overlaps a portion of the discharge aperture of the second gate flow member, forming a delivery opening for the variable discharge mechanism between the discharge outlet of the hopper and the spinner. The first and second flow gate members are mounted for rotational movement independently of one another to vary the size of the distribution outlet, thereby varying the volume flow rate.

In accordance with a feature of the invention, the variable discharge mechanism includes a locking mechanism that allows the first and second flow gate members to be locked together to allow the first and second flow gate members to be moved together as a unit to reposition the delivery opening, thereby changing the distribution pattern provided by the hopper spreader.

Further in accordance with the invention, there is provided a variable discharge mechanism for a hopper spreader apparatus, the variable discharge mechanism including first and second flow gate members each having an aperture through a planar surface thereof, the first and second flow gate members interposed between the discharge outlet of the hopper and the spinner. The first flow gate member overlies the second flow gate member and the flow gate members are aligned so that the aperture of the first flow gate member at least partially overlaps a portion of the aperture of the second flow gate member. The first and second flow gate members are mounted for rotational movement with respect to one another to vary the size of the distribution outlet provided by the first and second flow gate members.

It may therefore be seen that the present invention provides a hopper spreader apparatus including a variable discharge mechanism that allows varying the discharge rate by providing relative rotation between flow gate members to adjust the size of a delivery opening and thus the discharge volume flow rate to a spinner located beneath the discharge outlet of the hopper. In addition, the location of the delivery opening with respect to the spinner can be changed, thereby changing the distribution pattern for the material being spread.

The apparatus of the present invention is of a construction which is both durable and long lasting, and which will require little or no maintenance to be provided by the user throughout its operating lifetime. The apparatus of the present invention is also of inexpensive construction to enhance its market appeal and to thereby afford it the broadest possible market. Finally, all of the aforesaid advantages and objectives are achieved without incurring any substantial relative disadvantage.

DESCRIPTION OF THE DRAWINGS

These and other advantages of the present invention are best understood with reference to the drawings, in which.

DETAILED DESCRIPTION OF THE PREFERRED EMBODIMENT

Figure 1:
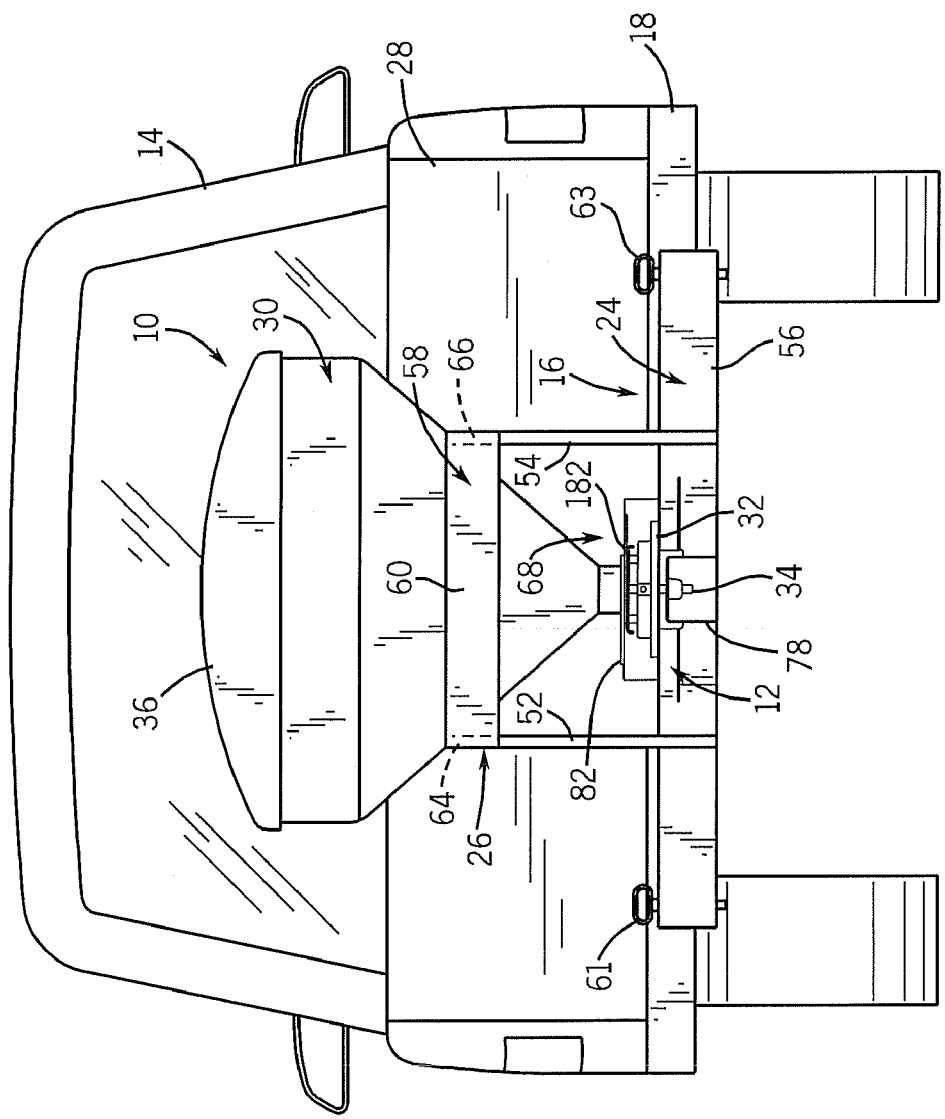
FIG. 1 is a view illustrating a hopper spreader apparatus including the variable discharge mechanism provided in accordance with the invention, with the hopper spreader apparatus shown mounted to the rear of a vehicle.

Referring to FIG. 1 of the drawings, there is shown a hopper spreader apparatus 10 incorporating a variable discharge mechanism 12 in accordance with the present invention. By way of example, the hopper spreader apparatus 10 is described with reference to an application for spreading dry, free flow material, such as salt, sand and the like, onto a surface being traveled by a vehicle 14, such as the pickup truck illustrated in FIG. 1, to which the hopper spreader apparatus 10 is mounted. However, the hopper spreader apparatus 10 can be mounted to other vehicles including but not limited to, highway trucks and the like, when the particulate material to be spread is salt or sand and the like. Moreover, the hopper spreader apparatus 10 can be used on other types vehicles, such as tractors or farm wagons, for example, when the particulate material to be spread is seed or fertilizer, or any other free flowing material.

In the preferred embodiment, the hopper spreader apparatus 10 is adapted for mounting to a vehicle that has a conventional trailer hitch (not shown) located at the rear of the vehicle. Such trailer hitches commonly are located below and behind the rear bumper 18 of the vehicle.

Figure 2:
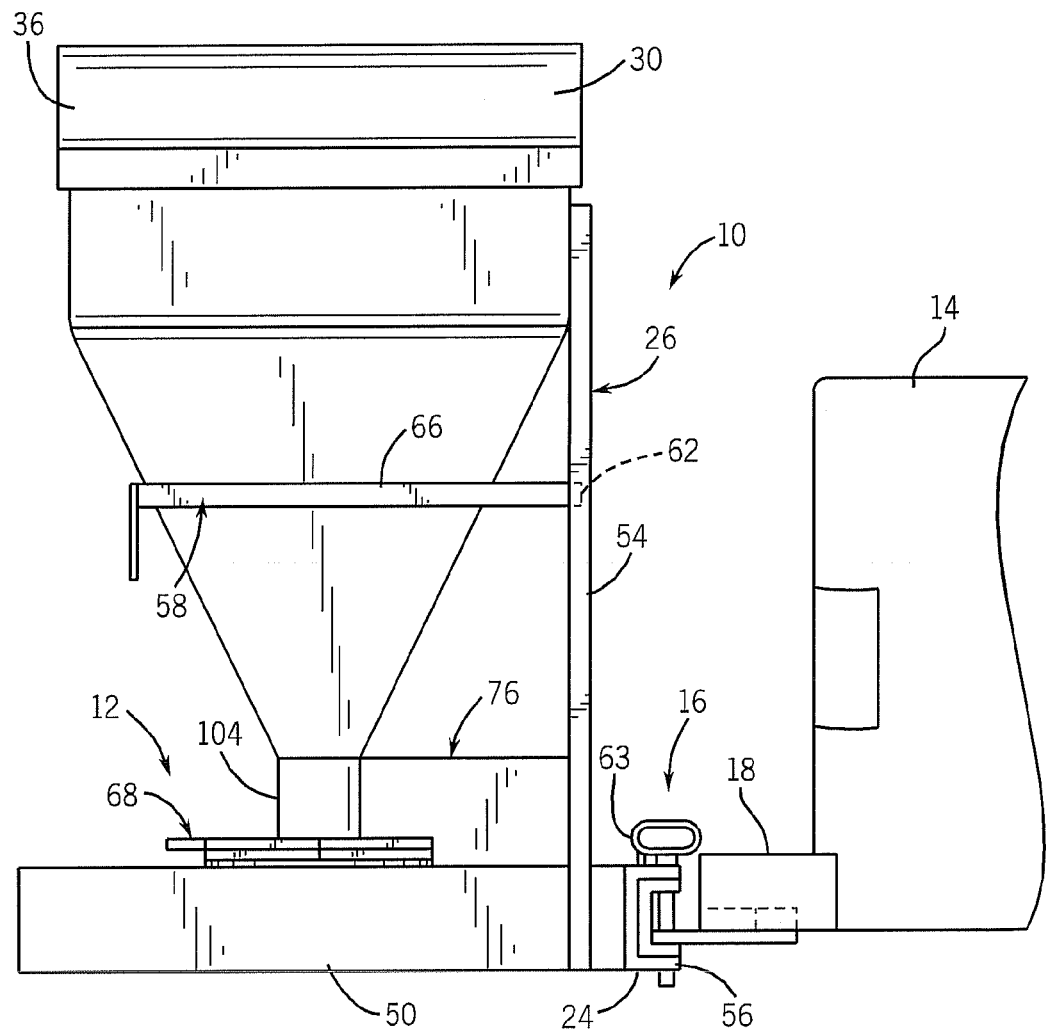
FIG. 2 is a side elevation view of a portion of the hopper spreader apparatus of FIG. 1 showing the mounting arrangement.
Figure 3:
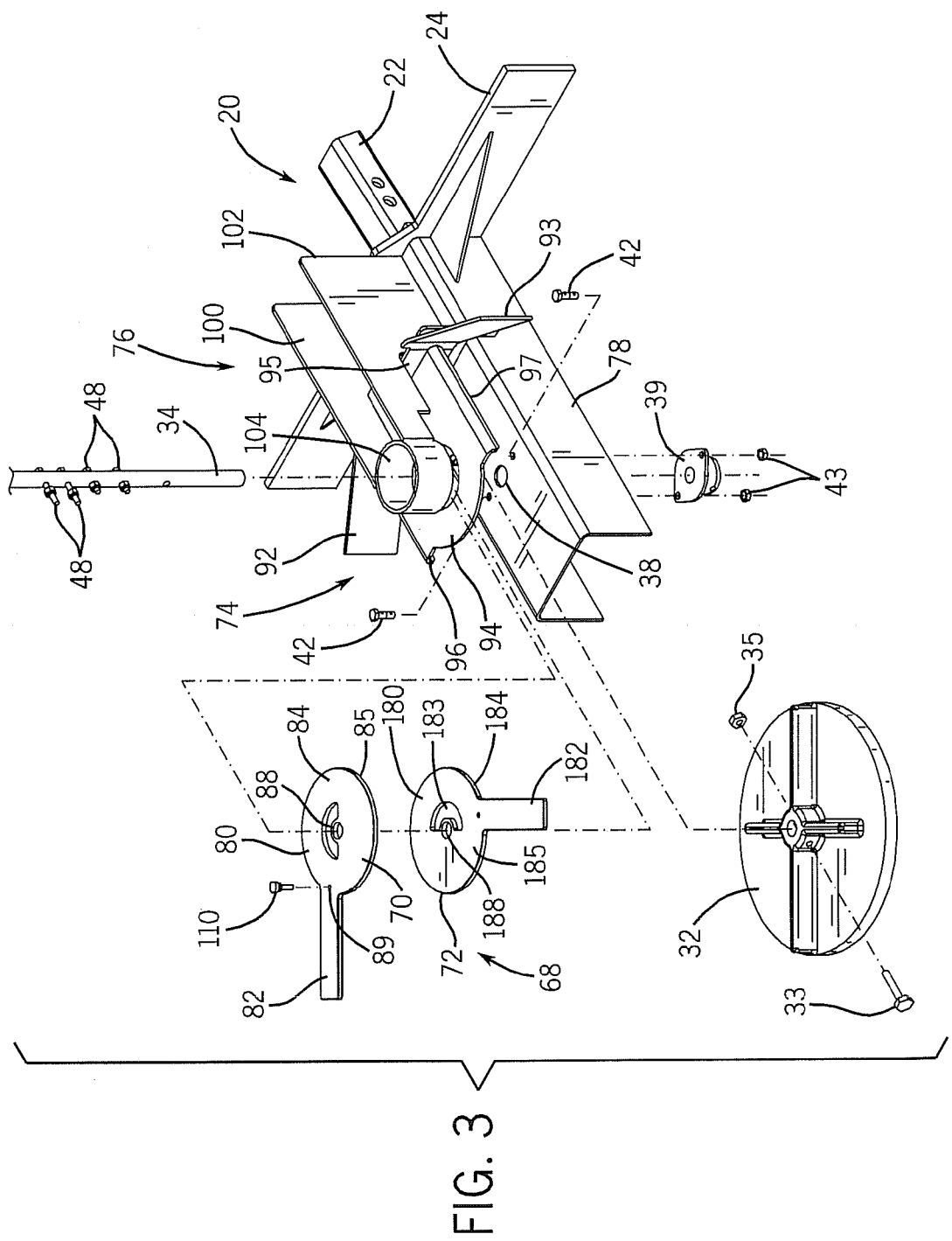
FIG. 3 is an exploded view of a portion of the hopper spreader apparatus of FIG. 1 showing the variable discharge mechanism of the hopper spreader apparatus of FIG. 1.

Referring to FIGS. 1 and 2, to this end, the hopper spreader apparatus 10 includes a mounting assembly 16, shown in FIG. 1, having a hitch adapter 20, shown in FIG. 3, that couples the mounting assembly 16 to the trailer hitch of the vehicle 14. The hitch adapter 20 includes a hitch tube 22 that is generally rectangular in cross section and is dimensioned to be received in the rectangular opening (not shown) of a conventional trailer hitch. The hitch tube 22 is of a strong inflexible material, such as steel, and is of sufficient length to support the hopper spreader apparatus 10 spaced rearwardly of the vehicle tailgate 28 at the rear of the vehicle 14. The hitch tube 22 includes a mounting assembly 24 that is coupled to a support frame 26 (FIG. 1), that facilitates pivoting and removable mounting of the hopper spreader apparatus 10 to the vehicle 14. The mounting assembly 24 can include nested beams 56 that are pivotally connected at opposite ends by pull pins 61 and 63, allowing pivoting of the mounting assembly 24 about either end. The connections between the mounting member and the support frame can be made in any suitable way such as by welding. In the following description of the hopper spreader apparatus 10, the term "front" refers to the portions of the hopper spreader apparatus 10 immediately adjacent to the vehicle tailgate 28 and the term "rear" refers to the rearmost portions of the hopper spreader apparatus 10 and which are displaced rearwardly of the vehicle tailgate 28. Also, the terms "left" and "right" are taken as viewed toward the vehicle 14 from the rear in FIG. 1.

Figure 4:
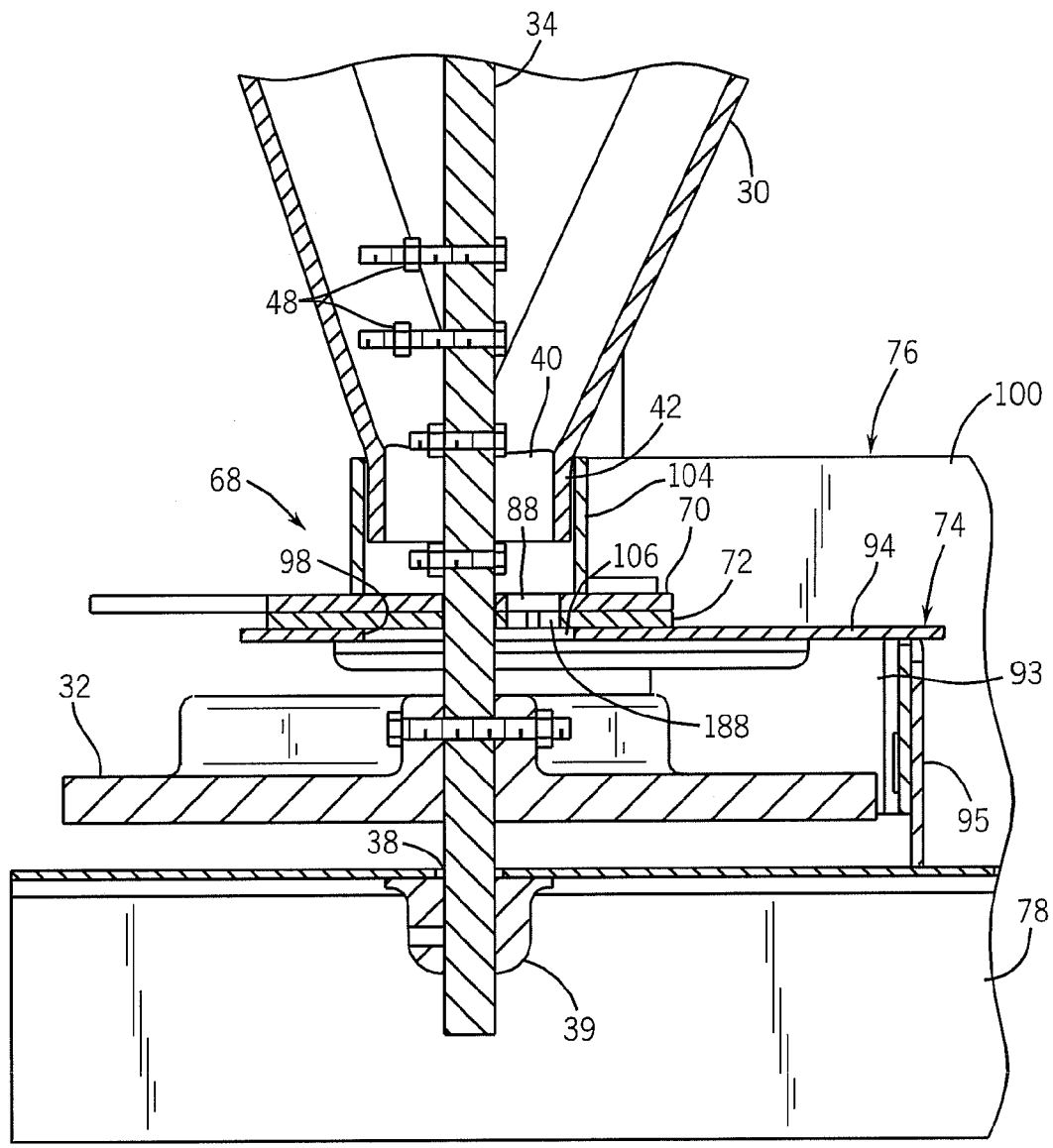
FIG. 4 is an enlarged fragmentary view, in section, of the discharge outlet of the hopper spreader apparatus of FIG. 1, showing the variable discharge mechanism of the present invention.

Referring to FIGS. 1 and 3-4, considering the hopper spreader apparatus 10 in more detail, the hopper spreader apparatus 10 includes a hopper 30 for containing the dry, free flow material to be spread, a spinner 32 located at a discharge outlet 40 (FIG. 3) of the hopper 30. The spinner 32 is rotated to spread the particulate material over a wide distribution area.

The hopper 30 is generally funnel shaped having an upper storage portion and a lower cylindrical outlet portion 44. The outlet portion 44 defines the hopper discharge outlet 40 near the lower end of the hopper 30, shown in FIG. 4, allowing the material contained within the hopper 30 to be fed by gravity to the discharge outlet 40. The hopper 30 includes a removable top 36 for filling of the hopper 30 with particulate material to be spread. The hopper 30 can be made of a rigid plastic material, such as polyethylene and the like. The hopper 30, the spinner 32 and the drive assembly can be supported by the support frame 26.

The spinner 32 is rotated by a drive assembly for spreading the dry free flow material being discharged from the hopper. The drive assembly can include a drive shaft 34 that is rotated by a drive motor (not shown) which can be located near the upper portion of the hopper 30. The spinner 32 is mounted on the drive shaft 34 to be rotated by the drive motor. The spinner 32 is attached to the drive shaft 34 by suitable hardware such as a bolt 33 that extends through aligned apertures in the hub of the spinner 32 and the drive shaft 34 and is held in place by a nut 35. The lower end of the drive shaft 34 extends through an aperture 38 in a beam 78 of the variable discharge mechanism 12 and is journaled in a lower shaft bushing 39. The lower shaft bushing 39 can be secured to the undersurface of the beam 78 by suitable hardware, such as bolts 42 and nuts 43. The spinner 32 is mounted on the shaft 34, spaced above the upper surface of the beam 78 as shown in FIG. 4. The drive shaft 34 can include a plurality of clump busters 48 to break up clumps in the material being discharged from the hopper 30 as the drive shaft 34 is rotated.

Referring to FIGS. 1, 2 and 4, the support frame 26 includes a base 50 and a pair of upright members 52 and 54 that extend upward vertically from the base 50 at the rear of the support frame. The upright members 52 and 54 support an open frame assembly 58 that receives and supports the hopper 30. The open frame assembly 58 is rectangular in shape and is formed by a rear cross member 60, a front cross member 62 (FIG. 2) that extends parallel to the rear cross member 60, and a pair of horizontal side members 64 and 66 (shown in phantom) that interconnect the rear cross member 60 and the front cross member 62 at opposite ends.

Figure 5:
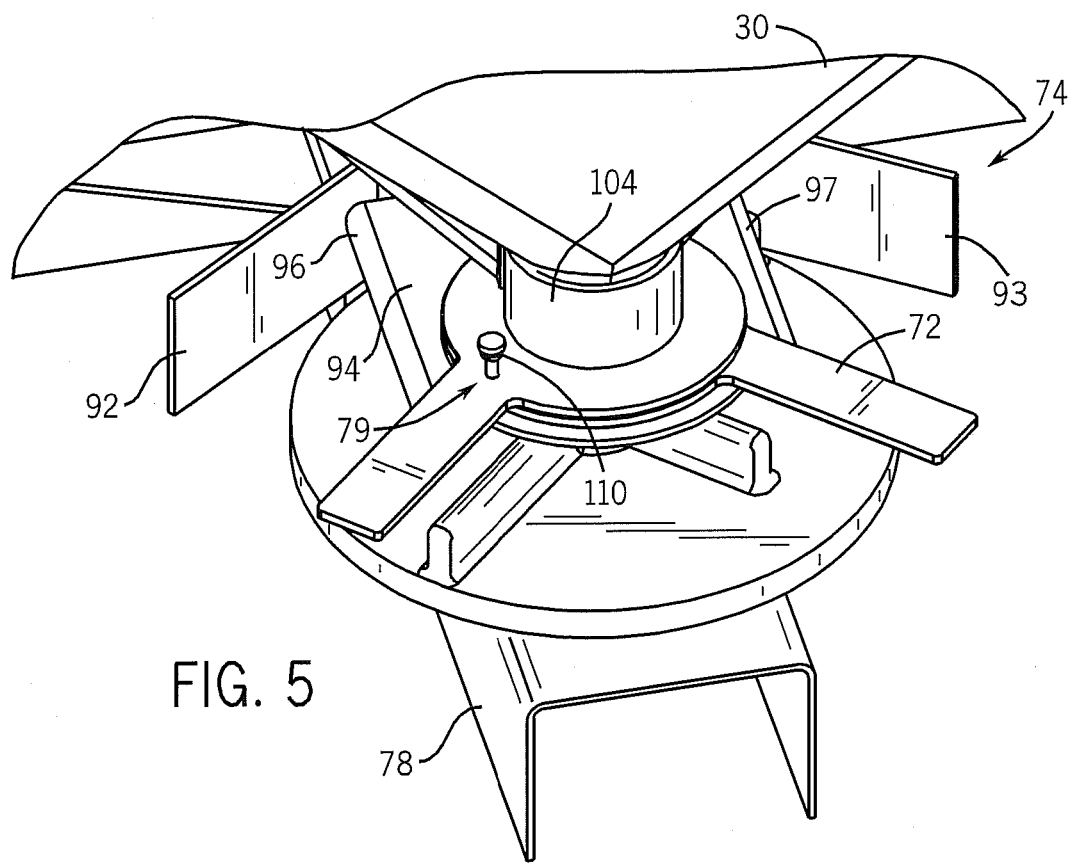
FIG. 5 is a perspective view of the lower portion of the hopper spreader apparatus of FIG. 1, showing the variable discharge mechanism provided by the present invention.

Referring to FIGS. 3-5, the variable discharge mechanism 12 includes a flow gate assembly 68, a deflection assembly 74, a stabilizing assembly 76 and support beam 78 that supports the flow gate assembly 68, the deflection assembly 74 and the stabilizing assembly 76 in an overlying relationship with the spinner 32. The support beam 78 is connected to the mounting member 24. The connection between the mounting member and the beam 78 can be made in any suitable way, such as by welding.

Figure 7:
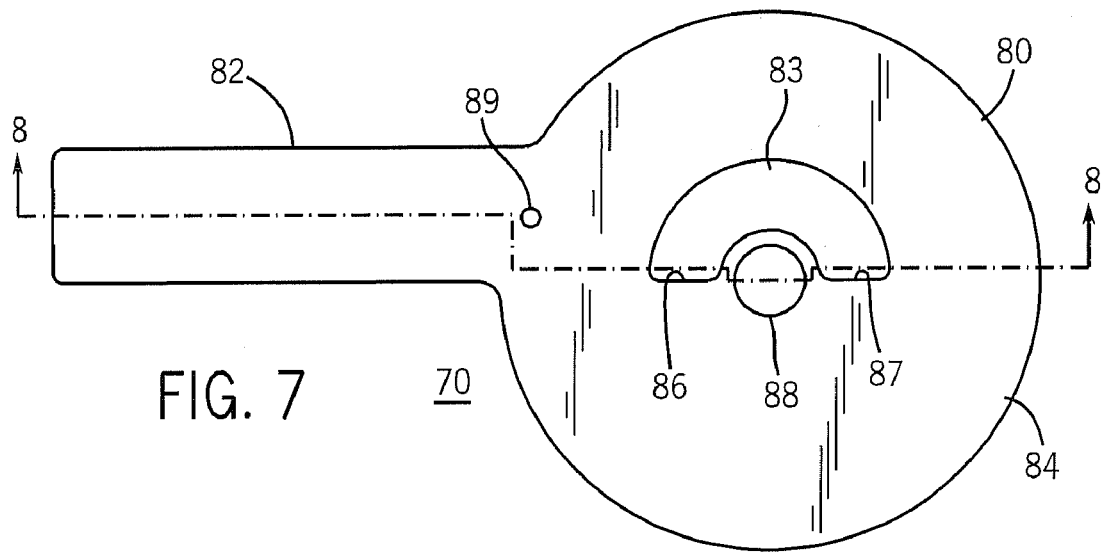
FIG. 7 is a top plan view of a flow gate member of the variable discharge mechanism provided by the present invention.
Figure 8:
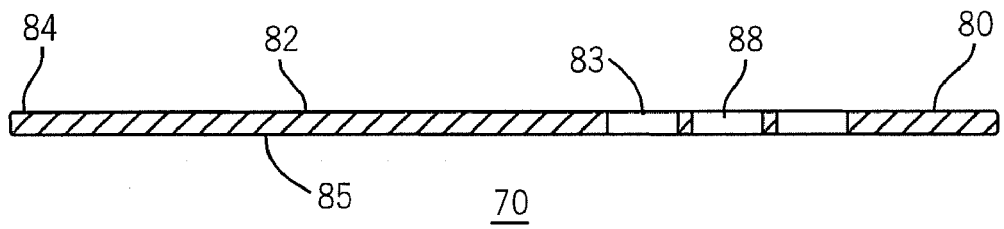
FIG. 8 is a side section view taken along the line 8-8 of FIG. 7.
Figure 9:
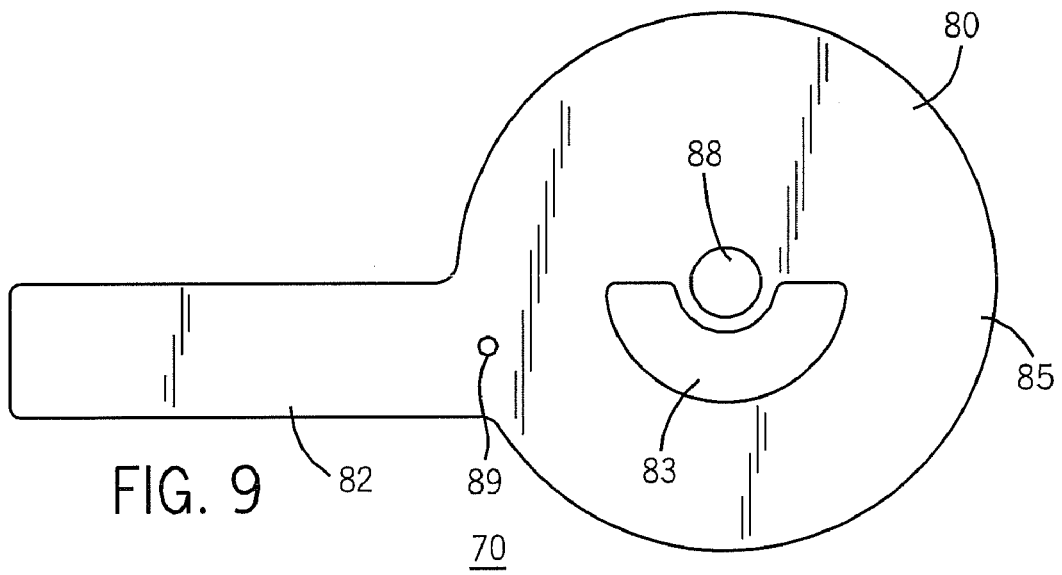
FIG. 9 is a bottom plan view of the flow gate member of FIG. 7.

Referring to FIGS. 7-9, the flow gate assembly 68 includes first and second flow gate members 70 and 72. The flow gate assembly 68 further includes a locking mechanism 79 for a purpose to be described. The flow gate members 70 and 72 are similar to one another and, accordingly, only the flow gate member 70 is described in detail. The flow gate member 70 is a paddle-like member that includes a body portion 80 and a handle 82. The body portion 80 is generally circular in shape. The handle 82 is elongated, generally rectangular in shape and projects outwardly from the body portion 80, with its longitudinal axis offset with respect to the diameter of the body portion 80.

The flow gate member 70 includes a discharge aperture 83 through the body portion 80 from an upper surface 84 to a lower surface 85 thereof and disposed near the center of the body portion 80. The discharge aperture 83 is in the form of a slot which can be generally arcuate in shape. In the preferred embodiment, the discharge aperture 83 is semi-circular or half-moon in shape. The ends 86 and 87 of the discharge aperture 83 extending along a line coextensive with the diameter of the body portion 80.

The flow gate member 70 further includes a mounting aperture 88 in the body portion 80 that allows the flow gate member 70 to be mounted on the drive shaft 34. The body portion 80 of the flow gate member 70 further includes a tapped hole 89 located at or near the center of the body portion 80 for a reason to be described.

Referring to FIGS. 3 and 5, the other flow gate member or paddle 72 is the similar to the flow gate member 70. However, the flow gate member 72 does include a tapped hole corresponding to the tapped hole 89 in the flow gate member 70. The gate member 72 includes a body portion 180 and a handle 182, a discharge aperture 183 and a mounting aperture 188. The flow gate member 72 has a surface 184 that corresponds to the upper surface 84 of the flow gate member 70 and a surface 185 corresponding to the lower surface 85 of flow gate member 70. When assembled together with the flow gate member 70, the flow gate member 70 is supported on the flow gate member 72, as shown in FIG. 4, with the flow gate member 72 turned over to be oriented with its surface 185 engaging the lower surface 85 (FIG. 3) of the flow gate member 70 so as to have mirror image symmetry with respect to the flow gate member 70. While it is advantageous to have the flow gate members 70 and 72 be substantially of the same shape and/or size, the flow gate members 70 and 72 can differ in shape and/or size. For example, in the preferred embodiment, the discharge apertures 83 and 183 of the flow gate members are of substantially the same size and shape. However, the discharge aperture 83 can be of a different size and/or shape as the discharge aperture 183. In addition, in the preferred embodiment, the body portions 80 and 180 and the handles 82 and 182 of the flow gate members are of substantially the same size and shape. However, the body portion 80 and/or the handle 82 of flow gate member 70 can be of different in size and/or in shape as the body portion 180 and/or the handle 182 of flow gate member 72. Moreover, the location of the pivot axes can be different for flow gate members having body portions that are similar in size and shape.

With continued reference to FIGS. 3 and 5, the locking mechanism 79 of the flow gate assembly 68 allows the flow gate members 70 and 72 to be locked in a different relative positions to provide variation in the size of a delivery opening 106, shown in FIG. 10, for example, formed by the discharge apertures 83 and 183 of the flow gate members 70 and 72 as will be described. The locking mechanism 79 includes a locking member 110, such as a nylon screw, that is received in the tapped hole 89 in one of the flow gate members, such as flow gate member 70 in the preferred embodiment. The locking member is carried by one of the flow gate members and has an engaging portion, the tip of the shank when the locking member is a screw, that is adapted to be moved into engagement with the other one of the flow gate members to lock together the first and second flow gate members, such as by frictional forces.

Referring to FIGS. 3-5, the deflection assembly 74 includes a left side deflector 92, a right side deflector 93, a top member 94 and a support plate 95. The left and right side deflectors 92 and 93, which are generally rectangular in shape, are oriented vertically and are supported by the support plate 95, also oriented vertically, but supported by the beam 78. The left and right side deflectors 92 and 93 extend outward rearwardly therefrom the support plate 95 (FIG. 4) at an angle relative to the support plate 95, defining a rearwardly directed deflector structure. The top member 94 is a flat plate with down-turned side edges 96 and 97. The top member 94 is supported in cantilever fashion by the support plate 95, proximal to, but located rearwardly of the deflectors 92 and 93. The top member 94 has an annular opening 98 (FIG. 4), the diameter of which is the inner diameter of the hopper outlet portion 44. The forward edge of the top member 94 is received in slots in support panels of the stabilizing assembly 76, such as the slot 99 in the support panel 100 as shown in FIG. 3. The connections between the deflectors 92 and 93, the top member 95, the support member 95, the support panels 102 and 104 and the beam 78 can be made in any suitable way, such as by welding.

Referring to FIGS. 3, 4 and 5, the stabilizing assembly 76 includes a pair of support panels 100 and 102 that support a sleeve 104 in the proximity of the outlet portion 44 of the hopper 30. The sleeve 104 is hollow and generally cylindrical in shape. The inner diameter of the sleeve 104 is slightly larger than the outer diameter of the cylindrical outlet portion 44 of the hopper 30 to permit the outlet portion 44 of the hopper 30 to extend into the sleeve 104. The purpose of the sleeve 104 is to prevent the hopper 30 from pivoting on its outlet portion 44 to prevent damage to the discharge output portion of the hopper 30, as is known in the art.

Referring to FIGS. 3 and 4, the flow gate assembly 68 is mounted on the deflection assembly 74, with the flow gate members 70 and 72 interposed between the discharge outlet 40 of the hopper 30 and the spinner 32. The flow gate member 70 overlies the flow gate member 72 with the discharge aperture 83 of the flow gate member 70 located to overlap at least a portion of the discharge aperture 183 of the flow gate member 72 as shown best in FIGS. 10-12, for example. The drive shaft 34 extends through the aligned mounting apertures 88 and 188 in the flow gate members 70 and 72 and is rotatable with respect to the flow gate members. The flow gate members 70 and 72 rest on and are supported by the upper surface of the top member 94 as shown in FIG. 4. When thus assembled together, the overlapping discharge apertures 83 and 183 of the flow gate members 70 and 72 define a variable and displaceable distribution or delivery opening 106 that is interposed between the discharge outlet 40 of the hopper 26 and the spinner 32. In accordance with the invention, the delivery opening 106 is variable in size and is displaceable, allowing regulation of both the volume and the distribution pattern of material being discharged by the hopper spreader apparatus as will be shown. The size of delivery opening 106 can be varied to vary the discharge rate by providing relative rotation between the flow gate members 70 and 72 to adjust the discharge volume flow rate. In addition, the distribution pattern can be changed by changing the location of the delivery opening 106 with respect to the spinner 32. This can be done by rotating the flow gate members 70 and 72 as a unit, clockwise or counterclockwise, about the axis of the drive shaft 34. The half-moon shaped apertures 83 and 183 are located concentric over the spinner 32, offset with respect to the center of body portion 80 but nearer to the center of the body portion than to the periphery of the body portion. Accordingly, the material being discharged from the hopper 30 is directed more toward the center of the spinner 32 than toward the outer edge of the spinner. Consequently, it takes longer for the material being discharged to be "spread" by the spinner 32, than were the material applied to the edge of the spinner as is the case for prior art discharge mechanisms.

Figure 10:
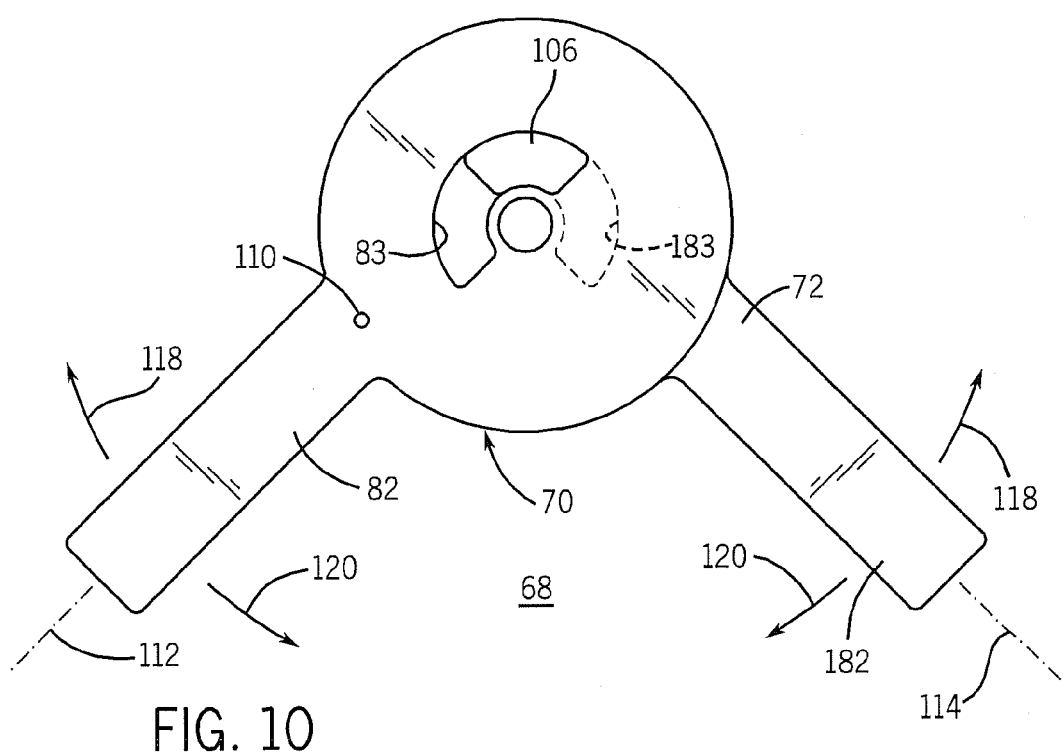
FIG. 10 is a top plan view of the flow gate assembly of the variable discharge mechanism shown operated to an intermediate position.

Referring to FIGS. 5 and 10, by way of example, the orientation of the two flow gate members 70 and 72 can be such that an "average" discharge volume flow rate is provided for particulate matter being discharged from the hopper 30. This orientation is illustrated in FIGS. 5 and 10, for example, in which the arcuate length of the delivery opening 106 is approximately one-half the arcuate length of either of the discharge openings 83 and 183. In this orientation, the longitudinal axes 112 and 114 of the handles 82 and 182 of the flow gate members 70 and 72 extend at angles of about ±45° with respect to a horizontal axis 116 (FIG. 13) that extends in the direction of travel of a vehicle on which the hopper spreader apparatus is mounted.

Referring to FIGS. 3 and 5, the locking mechanism 79 allows the flow gate members 70 and 72 to be locked in a given orientation by advancing the locking member 110 into or backing the locking member 110 out of the tapped hole 89. The locking member 110 can be backed out of the tapped hole 89 to a release position in which the flow gate members 70 and 72 are individually adjustable. The locking member 110 can be advanced part way into the tapped hole 89 to cause the flow gate members 70 and 72 to be maintained in frictional engagement, allowing the flow gate members to be rotated together as a unit. Also, the locking member 110 can be advanced further to a locking position in which the lower flow gate member 72 is urged against the upper surface of the top member 94 (FIG. 4), so that the flow gate members 70 and 72 cannot be rotated and are locked in position.

Referring to FIG. 10, the flow gate members 70 and 72 of the variable discharge mechanism 12 are shown operated to an intermediate position. To position the flow gate members 70 and 72 in the intermediate position, the flow gate members 70 and 72 are rotated manually in opposite directions until they are separated from one another by an angular distance of about 90°. In this orientation, the uppermost flow gate member 70 covers a portion of the aperture 183 of the underlying flow gate member 72 and a portion of the aperture 83 of the uppermost flow gate member 70 is covered by the underlying flow gate member 72 so that the size of the delivery opening 106 is smaller than that for the orientation shown in FIG. 11, for example, and larger than that for the orientation shown in FIG. 12, for example.

Figure 11:
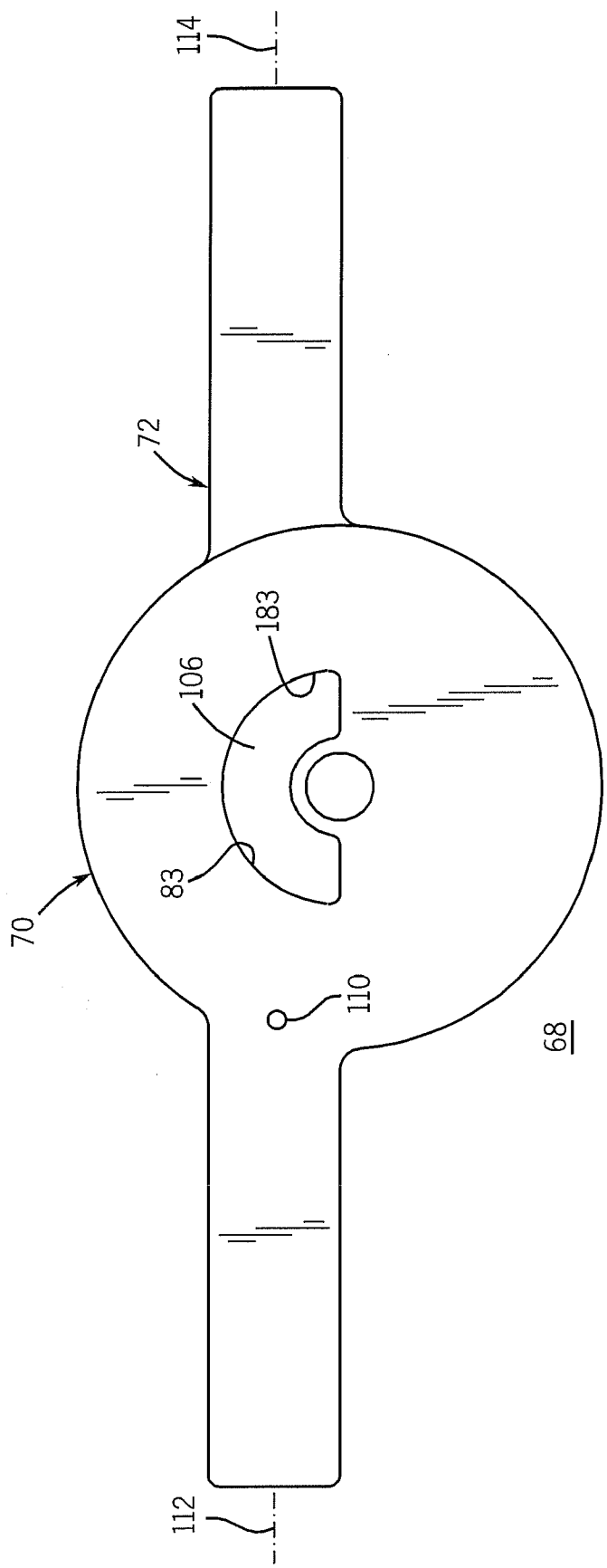
FIG. 11 is a top plan view of the flow gate assembly of the variable discharge mechanism shown operated to a fully open position.

With reference to FIG. 11, in another orientation, the flow gate members 70 and 72 of the variable discharge mechanism 12 are operated to a fully open position such that the handles of the flow gate members 70 and 72 extend coaxially. Starting from the relative orientation of the two flow gate members 70 and 72 as shown in FIG. 10, to position the flow gate members 70 and 72 in the fully open position, the handles 74 of the flow gate members 70 and 72 are rotated away from one another manually in the direction of the arrows 118 in FIG. 10 to the positions shown in FIG. 11. With the flow gate members in the positions shown in FIG. 11, the upper flow gate member 70 and the lower flow gate member 72 are located to overlap one another so that the size of the delivery opening 106 defined by the flow gate members is maximum.

Figure 12:
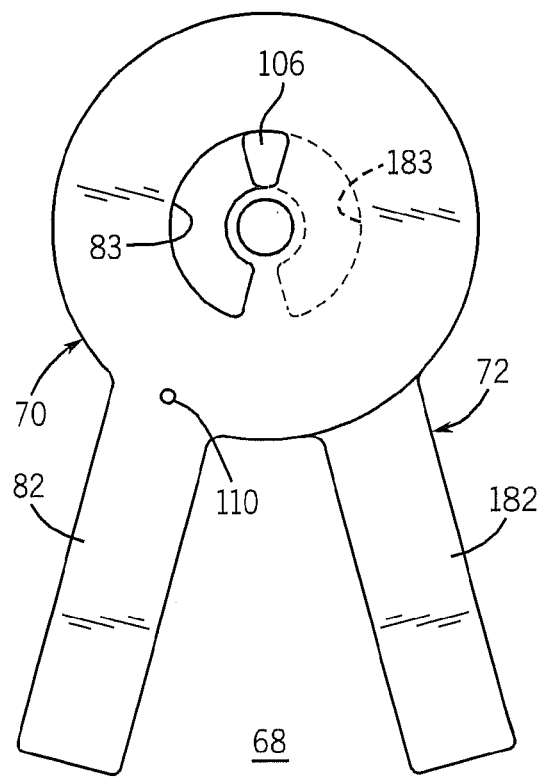
FIG. 12 is a top plan view of the flow gate assembly of the variable discharge mechanism shown operated to a nearly closed position.

Referring to FIG. 12, the flow gate members 70 and 72 of the variable discharge mechanism 12 are shown operated to a nearly closed position in which the flow gate members 70 and 72 rotated are separated by about 40°. Starting from the relative orientation of the two flow gate members 70 and 72 as shown in FIG. 9, the handles 82 and 182 of the flow gate members 70 and 72 are rotated toward one another manually in the direction of the direction of arrows 120 in FIG. 10, to the positions shown in FIG. 12. With the flow gate members 70 and 72 in the positions shown in FIG. 12, the upper flow gate member 70 covers a greater portion of the aperture 183 of the underlying flow gate member 72 and a greater portion of the aperture 83 of the upper flow gate member 70 is covered by the underlying bottom flow gate member 72, minimizing the amount of overlap of the apertures 83 and 183 so that the delivery opening 106 is smaller than for the relative positions of the flow gate members shown FIGS. 10 and 11.

Thus, the flow gate members 70 and 72 can be moved manually by an operator to the positions shown in FIGS. 11 and 12 by grasping the handles 82 and 182, one in each hand, and rotating the flow gate members 70 and 72 in opposite directions. In accordance with a feature of the invention, the positions of the handles 82 and 182 provide an indication to the operator as to the size of the delivery opening (and thus the volume flow rate that can be expected), which is not readily viewable because of its location within the variable discharge mechanism 12 as is evident from FIGS. 1 and 5. For example, with the handles 82 and 182 in the positions shown in FIG. 10, each located displaced about 45° from the horizontal axis 116, this represents the setting for an average, or normal discharge flow rate. With the handles 82 and 182 in the positions shown in FIG. 11, each rotated about 90° from the axis 116, such positions represent the setting for a maximum discharge flow rate. With the handles 82 and 182 in the positions shown in FIG. 12, each rotated about 20° from the axis 116, such positions represent the setting for a minimum discharge flow rate. Thus, with a glance, the operator has an indication of the current volume flow rate setting for the variable discharge apparatus 12. The annular opening 98 (FIG. 4) in the top member 94 is sufficiently large as to allow the rotational repositioning of the flow gate members 70 and 72 without covering any portion of the delivery opening 106 formed by the flow gate members 70 and 72.

Figure 13:
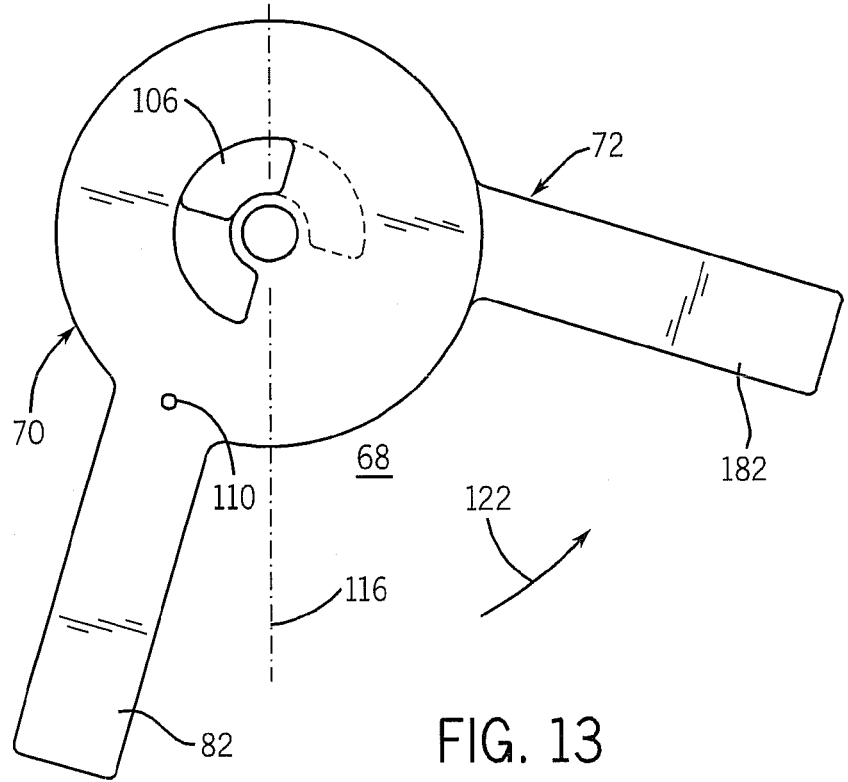
FIG. 13 is a top plan view of the flow gate assembly of the variable discharge mechanism shown operated to a position in which the delivery opening is located offset to one side from a line extending along the direction of travel of the vehicle on which the hopper spreader apparatus is mounted.

Referring to FIG. 13, alternatively, by adjusting the locking member 110 to lock together the flow gate members, both of the flow gate members 70 and 72 can be rotated as a unit counterclockwise in the direction of the arrow 122, such that the delivery opening 106 is located offset to the left side of the hopper spreader apparatus 10. Similarly, the flow gate members 70 and 72 can be rotated as a unit clockwise such that the delivery opening 106 is located offset to the right side of the hopper spreader apparatus 10. With such positionings of the flow gate members, the material being dispensed is directed to the left (or right) side of the direction of travel of the vehicle.

Figure 6:
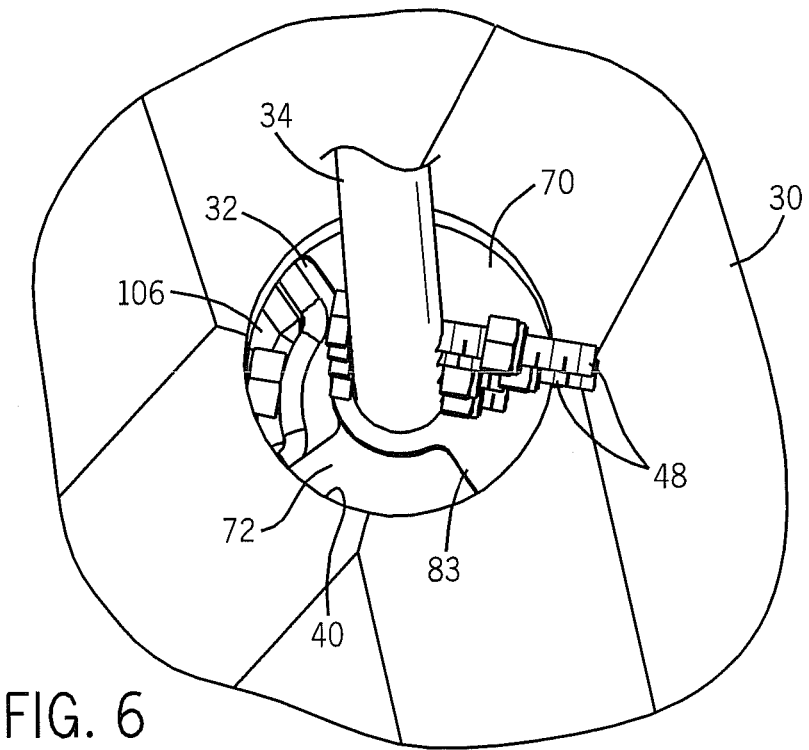
FIG. 6 is a view showing the discharge outlet of the hopper of the hopper spreader apparatus of FIG. 1 from the interior of the hopper.

Referring to FIGS. 5 and 6, by rotating the spinner 32 as the particulate material is being delivered to the spinner 32, the particulate material is centrifugally propelled by the spinner 32 in a wide pattern onto the ground surface on which the vehicle 14 is moving. Because the half-moon shaped apertures 83 and 183 are located concentric over the spinner 32, but are offset slightly forwardly with respect to the center of body portion 80, the material being discharged from the hopper 30 is directed more toward the center of the spinner 32 than toward the outer edge of the spinner. Consequently, it takes longer for the material being discharged to be "spread" by the spinner 32, than were the material applied to the edge of the spinner as is the case for prior art discharge mechanisms.

It may therefore be appreciated from the above detailed description of the preferred embodiment of the present invention that it provides a variable discharge mechanism for a hopper spreader apparatus. The variable discharge mechanism allows varying the discharge rate by providing relative rotation between flow gate members to adjust the size of a delivery opening and thus the discharge volume flow rate. In addition, the distribution pattern can be changed by changing the location of the delivery opening with respect to the spinner. This can be done by rotating the flow gate members as a unit, clockwise or counterclockwise, about the axis of the drive shaft.

Although an exemplary embodiment of the present invention has been shown and described with reference to particular embodiments and applications thereof, it will be apparent to those having ordinary skill in the art that a number of changes, modifications, or alterations to the invention as described herein may be made, none of which depart from the spirit or scope of the present invention. All such changes, modifications, and alterations should therefore be seen as being within the scope of the present invention.

What is claimed is:

1. A variable discharge mechanism for a hopper spreader apparatus including a hopper having a discharge outlet for dispensing particulate material; and a spinner carried by a drive shaft, the spinner located adjacent to the discharge outlet for distributing material dispensed from the hopper, said variable discharge mechanism comprising:

a flow gate assembly including first and second flow gate members each having a discharge aperture therethrough, said first and second flow gate members interposed between the discharge outlet of the hopper and the spinner, said first flow gate member overlying said second flow gate member and said first and second flow gate members aligned so that said discharge aperture in said first flow gate member at least partially overlaps a portion of the discharge aperture of said second flow gate member, defining a delivery opening interposed between the discharge opening of the hopper and the spinner, and said first and second flow gate members mounted for relative angular movement independently of one another to different relative positions to adjust the size of said delivery opening to a desired setting, wherein said flow gate assembly includes a locking member carried by one of said flow gate members, said locking member extending through an aperture in said first flow gate member, said locking member being operable between locking and release positions, said locking member having an engaging portion moved into engagement with said second flow gate member when said locking member is operated to said locking position to lock together said first and second flow gate members in any of said positions, allowing said first and second flow gate members to be rotated as a unit to reposition the delivery opening that is defined by said first and second flow gate members with respect to the spinner while maintaining the desired setting for the delivery opening.

2. The variable discharge mechanism according to claim 1, wherein said first and second flow gate members are adapted for rotational movement independently of one another to vary the size of said delivery opening defined by said first and second flow gate members, thereby varying the discharge volume flow rate for the material.

3. The variable discharge mechanism according to claim 1, wherein the hopper spreader apparatus is adapted for mounting on a vehicle, and wherein said first and second flow gate members are adapted to change the location of the delivery opening with respect to an axis extending in the direction of travel of the vehicle, thereby changing the distribution pattern for the material.

4. The variable discharge mechanism according to claim 1, wherein at least one of said flow gate members includes a handle to facilitate relative angular positioning of said first and second flow gate members.

5. The variable discharge mechanism according to claim 1, wherein each of said first and second flow gate members includes a handle to facilitate relative positioning of said flow gate members.

6. The variable discharge mechanism according to claim 5, wherein said handles provide a reference indicative of the relative size of said delivery opening defined by said first and second flow gate members.

7. The variable discharge mechanism according to claim 1, wherein the hopper spreader apparatus is adapted for mounting on a vehicle, and wherein said first and second flow gate members are repositionable as a unit to locate said delivery opening to either side of an axis extending in the direction of travel of the vehicle.

8. The variable discharge mechanism according to claim 1, wherein said discharge aperture of each of said flow gate members is generally arcuate in shape.

9. The variable discharge mechanism according to claim 8, wherein said discharge aperture of said first flow gate member is substantially identical in size and shape with said discharge aperture of said second flow gate member.

10. The variable discharge mechanism according to claim 8, wherein at least one of said flow gate members includes a handle to facilitate relative movement of said first and second flow gate members.

11. The variable discharge mechanism according to claim 8, wherein each of said first and second flow gate members includes a handle to facilitate relative movement of said first and second flow gate members.

12. The variable discharge mechanism according to claim 11, wherein said handles of said first and second flow gate members provide a reference indicative of the relative size of said delivery opening.

13. The variable discharge mechanism according to claim 1, wherein said locking member includes a locking pin carried by said one flow gate member.

14. The variable discharge mechanism according to claim 1, wherein each flow gate member is a paddle-like member including a body portion and an elongated handle, said body portion generally circular in shape with said handle projecting outwardly from the body portion.

15. The variable discharge mechanism according to claim 1, wherein each flow gate member is a paddle-like member including a body portion and a handle, said body portion generally circular in shape, said handle being elongated, generally rectangular in shape and projecting outwardly from the body portion with a longitudinal axis offset with respect to the diameter of the circular body portion.

16. The variable discharge mechanism according to claim 15, wherein said second flow gate member has mirror image symmetry with respect to said first flow gate member.

\* \* \* \* \*